INVENTOR:
EUGEN MERTEN

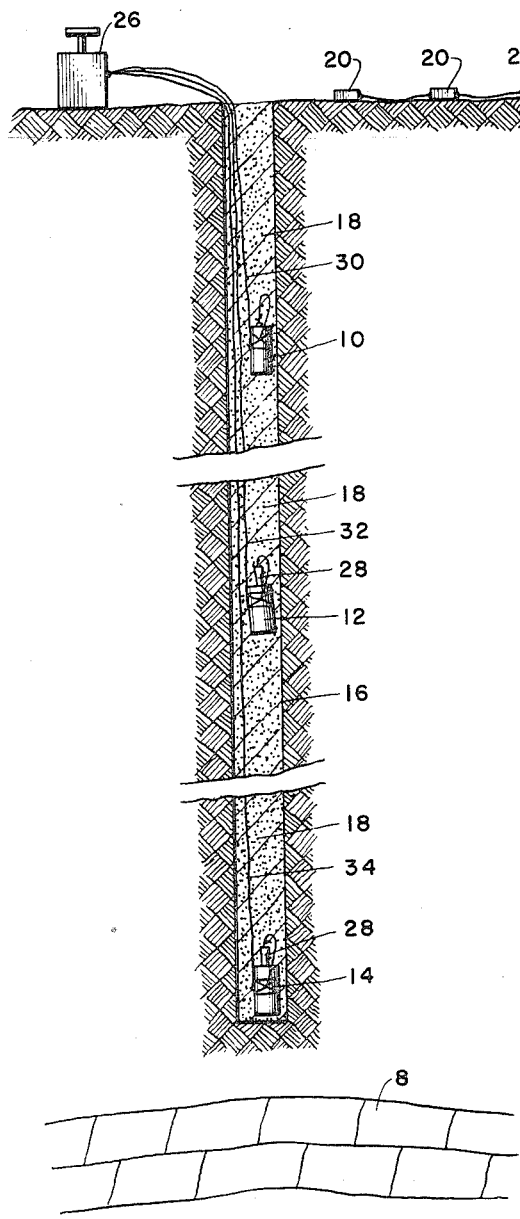
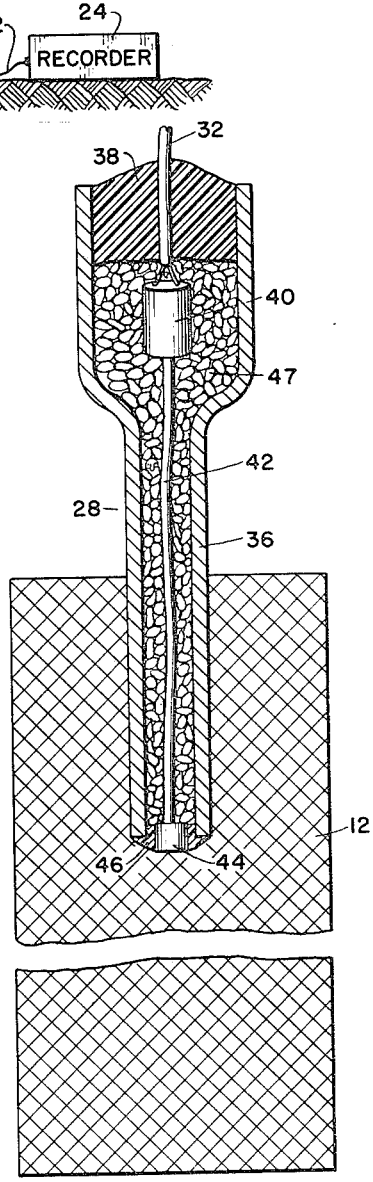
FIGURE 2
FIGURE 3
INVENTOR:
EUGEN MERTEN
BY: *James Todorovic*
HIS ATTORNEY Sept. 20, 1960     E. MERTEN     2,953,214
SEISMIC EXPLORATION Filed Feb. 27, 1957     3 Sheets-Sheet 3

INVENTOR:
EUGEN MERTEN
BY: *James Todorovic*
HIS ATTORNEY

United States Patent Office 2,953,214
Patented Sept. 20, 1960

1

2,953,214

SEISMIC EXPLORATION

Eugen Merten, Houston, Tex., assignor to Shell Oil Company, New York, N.Y., a corporation of Delaware Filed Feb. 27, 1957, Ser. No. 642,725

5 Claims. (Cl. 181—.5)

This invention relates to seismic exploration or prospecting and pertains, more particularly, to a novel method of and apparatus for exploding seismic shots.

Heretofore, it has been common practice to arrange a line of seismic detectors over the geological area to be surveyed, detonate an explosive charge for initiating seismic waves from a known shot point, and subsequently to record seismograms from which the character of the subsurface formations could be determined.

When it was desired to detonate explosives at different known depths from shot points disposed in substantially the same vertical line, it was the practice to drill a shot hole to the depth of the uppermost shot point, fire the shot, record the information desired, and subsequently repeat the operation at successively deeper shot points by redrilling and deepening the shot hole to the depth of the next succeeding shot point after each explosion. This procedure was necessary since there was no known way of detonating explosives at the lower shot points after the first explosion had blocked the shot hole and broken all connections between the explosives and the blasting mechanism at the surface of the ground. Since this procedure was relatively expensive and time consuming, it subsequently became the practice to drill the shot hole to the lowest depth first and to detonate explosives at the shot points in an ascending order. However, the latter procedure also proved to be unsatisfactory, since it was found that a significant portion of the seismic waves produced by detonations at depths above the lowest shot point pass substantially vertically downwards and are affected by cavernous or disrupted zones created in the formations by the preceding detonations whereby errors are introduced in the recorded seismograms. The probability of error appears to increase with the number of caverns and affected formations through which the seismic waves from each succeeding shot must pass.

Accordingly, an object of this invention is to provide a new and improved method and apparatus for seismic surveying which substantially overcomes the problems noted above.

Another object of this invention is to provide a method and apparatus whereby explosives can be arranged at different depths in a shot hole and detonated in a descend order and in a timed sequence such that seismic waves initiated by each explosion can be detected and recorded before the next succeeding charge is detonated.

Yet another object is to provide a new and improved time delay device and a control system for detonating charges as described above.

Further objects and advantages of the present invention will become apparent from the following description taken in connection with the accompanying drawings wherein:

Fig. 1 is a diagrammatic view showing the paths taken by the significant portions of seismic wave initiated from three vertically disposed shot points and reflected from a stratum.

2

Fig. 2 is a diagrammatic view showing one embodiment of the apparatus of the present invention in association with a shot hole;

Fig. 3 is a view in vertical section of a delay device forming part of the apparatus of the present invention;

While the vibrations from a seismic shot radiate in all directions, the vibrations of particular interest to the seismologists are those which travel in a substantially vertical downward direction. These vibrations strike layers of rock or other dense materials and become divided into portions that are reflected back to the surface, portions that travel longitudinally through layers of dense materials and send vibrations to the surface areas lying above their longitudinal travel path, and portions that travel farther down and are further divided when they strike materials having different acoustic properties. The surface returns provide the indications by which the seismologists seek to determine the character of the natural formations. The surface returns from vibrations which have traveled solely through undisturbed natural formations inherently provide the most accurate determinations of the natural stratigraphy.

Figure 1:
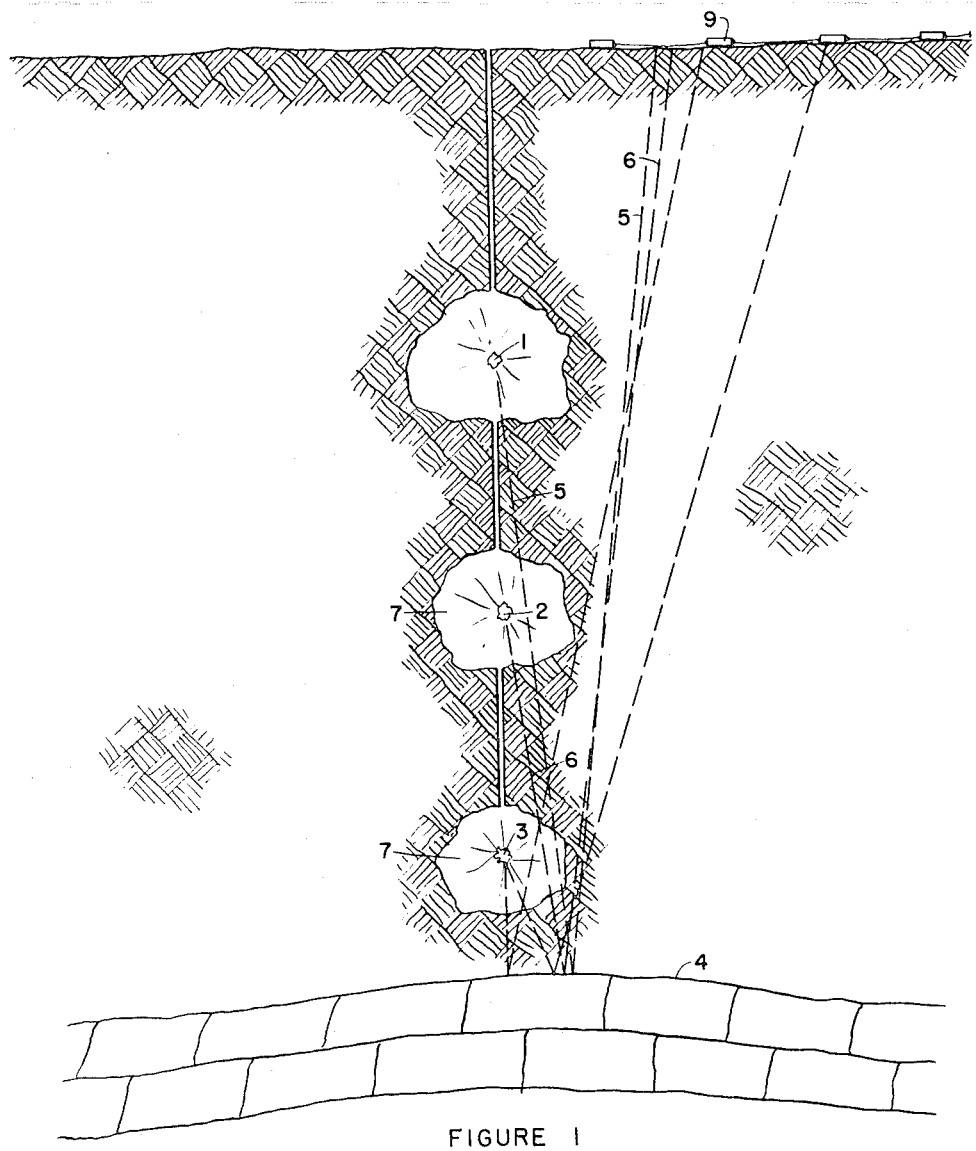

Fig. 1 illustrates the paths taken by some significant seismic waves which have been initiated, for example, from three vertically disposed shot points, 1 through 3, and which have been reflected from a stratum 4 to seismometers 9 and a recorder (not shown) arranged at the surface of the earth. From the illustration it may be seen that significant portions of the seismic waves 5 and 6 from shot points 1 and 2, respectively, pass through one or more of the cavernous or disrupted zones 7 which have been formed by detonations at lower shot points. As previously noted, these cavernous or disrupted zones introduce errors into seismograms recorded at or near the surface of the earth.

Figure 4:
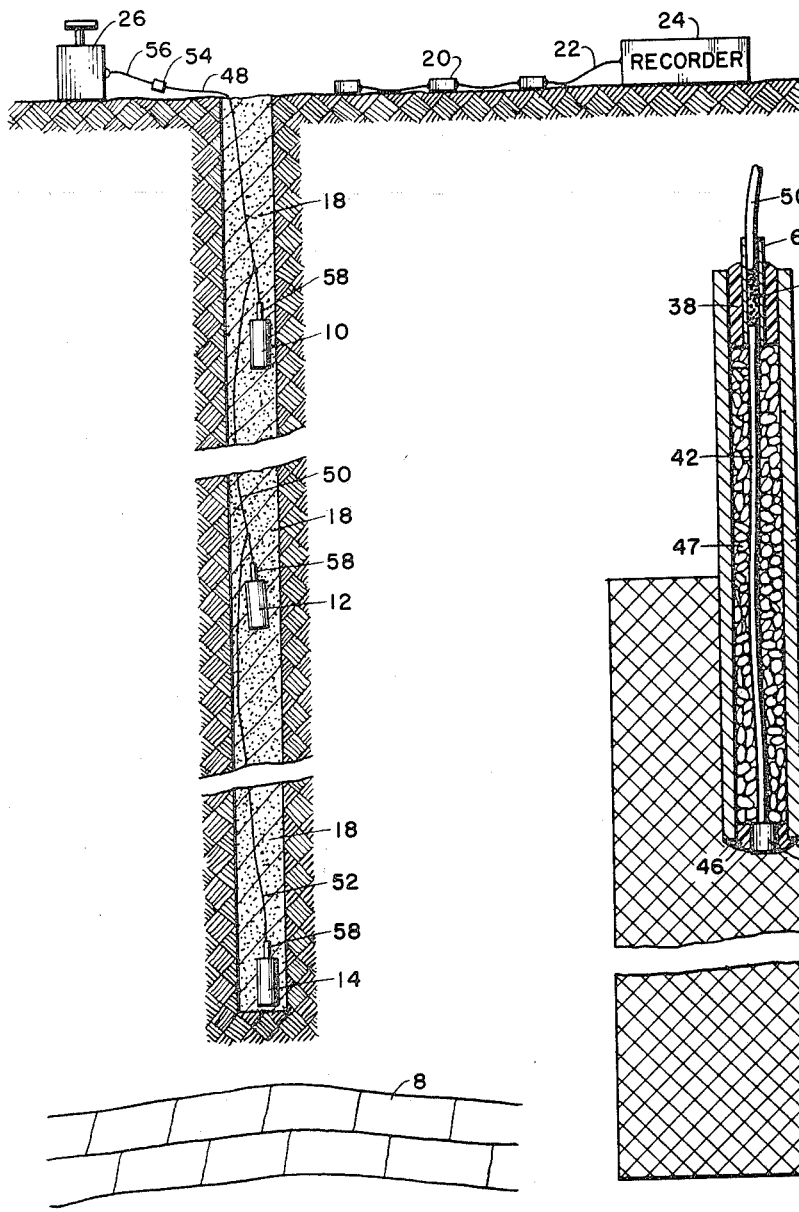
Fig. 4 is a diagrammatic view showing another embodiment of the apparatus of the present invention; and, Fig. 5 is a view in vertical section of another delay device forming part of the apparatus of the invention.

In practicing the method of the present invention, a vertical shot hole is drilled to the depth of the deepest desired shot point and an explosive charge is placed in the hole at each of a predetermined number of shot points or levels, for example, at three points as shown in Figs. 2 and 4. Preferably, the space between adjacent charges is filled with tamped earth or other suitable material whereby the shot hole is plugged to prevent the detonation of one charge from firing the others. Also, the space above the upper charge can be plugged if desired.

At the surface of the ground, the charges are connected to a suitable firing device which transmits a firing signal for simultaneously putting in operation a plurality of time delay devices. One of these devices is associated with each explosive charge excepting the upper charge which is preferably instantaneously detonated by the firing signal. However, if desired, a time delay device may also be employed for detonating the uppermost charge with a predetermined delay (Fig. 4). The time delays are set to detonate the charges in a descending order and in a timed sequence which permits the seismic waves initiated by each detonation to be reflected from important deep formations, for example, the formations 8 (Figs. 2 and 4) and to be detected at or near the surface of the earth by seismometers or other suitable devices which are disposed in a suitably pre-arranged pattern and transmit impulses to a recorder for recording separate seismograms of the waves initiated by each explosion before the next succeeding charge is detonated. By virtue of the above operation which is, of course, repeated at other predetermined locations in the area being surveyed, a seismic survey can be completed more rapidly, economically and more accurately than was heretofore possible.

Figs. 2 and 4 of the drawings show three explosive charges 10, 12, and 14 which are arranged at different levels in a shot hole 16 which has thereafter been plugged with earth or other suitable material 18. At one side of the shot hole a plurality of seismometers 20 are connected by a multiconductor cable 22 to a suitable recorder 24, and at the other side there is shown a device 26 for transmitting a firing signal to the charges. Any suitable explosive may be employed. A dynamite cartridge is preferred.

Referring now more particularly to Fig. 2, the time delay devices 28 are preferably started by an electric firing signal transmitted from the firing device 26. To this end, the charges are each connected to the firing device by separate insulated double conductor wires 30, 32 and 34. Preferably the wires are of a sufficient tensile strength to support the weight of the charges and thus may be looped around the charges as shown.

In the embodiment of Fig. 2, the wire 30 is connected directly to a detonator of conventional construction for instantaneously exploding the uppermost charge 10 in response to the firing signal. The wires 32 and 34 are directly connected to the devices 28 associated with the charges 12 and 14 for delaying the detonation of these charges as previously noted.

The delay devices 28 may be of any suitable type such, for example, as a clock-work mechanism, or the like. One embodiment of a preferred delay device is shown in Fig. 3 and comprises a metal casing 36, the lower end of which is preferably inserted in the explosive, for example, the charge 12. The upper end is provided with a fluid and pressure tight seal 38 which is formed of, for example, a plastic material which is a poor conductor of electricity. Extending through the seal is the firing signal wire, for example, the wire 32, the conductors of which are connected to any suitable electric squib 40. A suitable combustible time fuse 42 is attached between the squib and a combustible detonator 44 which is in direct contact with the explosive 12. A fluid and pressure tight seal 46 is also provided in the lower end of the casing 36.

In most cases combustible fuses are manufactured to burn at a known constant rate under unconfined or atmospheric pressure conditions. Confining such a fuse changes its burning rate apparently because the combustion products increase the pressure of the gas or air around the burning strands. Since a shot hole is usually filled with water or moist dirt and the pressure conditions normally vary from atmospheric pressure with the shot point depth, the fuse generally must be confined. Except for extremely fast burning combustible fuses having burning rates far in excess of that desired a combustible fuse therefore normally could not be employed as a dependable time delay element in the present apparatus. For example, in the case of a Thermolite Ignitacord fuse rated at 2 inches/sec. under atmospheric pressure conditions, it was found the burning rate was erratic and decreased by as much as a factor of 10 to about .2 inches/sec. when the fuse was confined. In accordance with the present invention, this problem is overcome by introducing into the substantially pressure tight interior of the casing 36, a solid gas absorbent material 47 capable of absorbing the gaseous combustion products of the fuse 42 and the squib 40. Such materials, as aluminum oxide, charcoal or preferably a molecular sieve such as a Linde 5Å activated silica gel type sieve may be employed. The amount of the gas absorbent material used is such that the pressure within the casing 36 remains substantially constant and preferably at atmospheric pressure during the burning of the electric squib 40 and fuse 42. Where the gas absorbent is a Linde 5Å activated silica gel sieve, an amount substantially filling the interior of the casing 36 around the fuse 42 and at least partially filling the casing around the squib is employed. Preferably, the inner diameter of the casing portions around the fuse 42 and squib 40 is about three times as large as the diameters of the fuse and squib, respectively, as shown in Fig. 3. Any suitable combustible material which burns at a substantially constant rate in air under atmospheric pressure conditions can be employed as the time fuse 42. Also, the fuse may be either of the externally burning type or of the internally burning type (in the latter case the flame propagates within a covering or wrapping such, for example, as a waterproof covering). An externally burning Thermolite Ignitacord fuse rate at 1–2 inches/sec. is preferred.

In operation of the delay device 28, the firing signal sets off the squib 40 which ignites the fuse 42 and thus starts the time delay period which is terminated by the explosion of the detonator 44 and the dynamite charge 12. The delay period is determined by the fuse length in each device 28, which length is preferably selected to provide a delay of about 4 seconds between the detonations of the charges 10, 12 and 14.

The foregoing description has been given for clearness of understanding only, and no unnecessary limitation should be implied therefrom, for it will be apparent to those skilled in the art that variations and changes may be made in the present method and apparatus without departure from the spirit and scope of the appended claims. For example, the charges 10, 12 and 14 may be connected in parallel as shown in Fig. 4 wherein a single firing signal is transmitted from the device 26 by means of three signal carrying lines 48, 50 and 52, connected as shown. The firing signal may be an electric signal, the lines 48, 50 and 52 may be double conductor insulated wires, and the delay device 28 of Fig. 3 may be employed as previously described. Alternatively, the lines may be formed of a detonating fuse such, for example, as a waterproof, non-conductive, Primacord fuse having a burning rate of about 4 miles/sec. Where the firing signal is transmitted by a Primacord fuse, the same device 26 may be employed by connecting a blasting cap 54 between the conductor 56 and the fuse 48 (Fig. 4).

Figure 5:
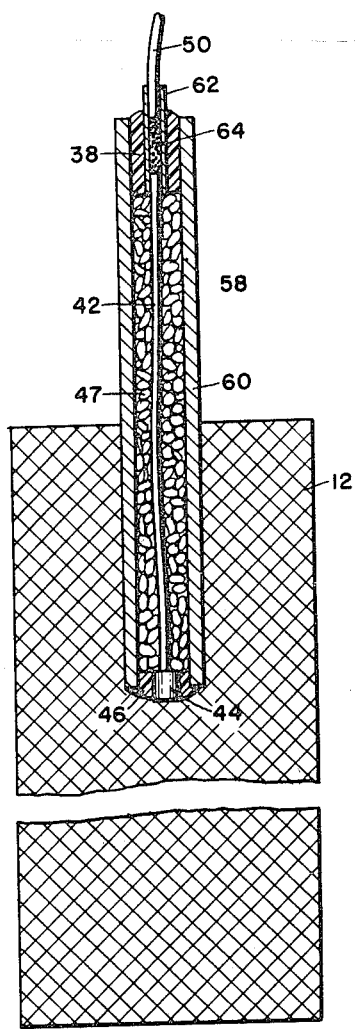

Fig. 5 illustrates a modified embodiment of a time delay device 58 which may be employed with the Primacord, like parts in Figs. 3 and 5 being indicated by like numbers. Since an enlarged squib is not employed, the device 58 is preferably provided with a casing 60 having an interior diameter which is uniformly about 3 times as great as that of the Ignitacord fuse 42. The device 58 is otherwise similar to the device of Fig. 2 except the fuse 42 is ignited by a different type of squib such as a lead spitter which is connected between the ends of the Primacord fuse, for example, the fuse 50, and the Ignitacord fuse 42. The lead spitter comprises a hollow lead tube 62 which is filled with black powder 64.

I claim as my invention:

1. The method of seismic surveying comprising the steps of: simultaneously energizing a plurality of sources of seismic disturbances which are arranged substantially vertically in the ground, sequentially delaying the actuation of said disturbances and detecting said disturbances, the time interval between the sequential actuations being greater than that required for the waves from a preceding disturbance to be reflected and detected.

2. The method of seismic surveying of claim 1 in which the sources are arranged in a downwardly-extending shot hole and actuated in a descending order.

3. The method of seismic surveying of claim 2 in which the shot hole is plugged between adjacent charges.

4. The method of seismic surveying of claim 2 in which the sources are energized by transmitting a single firing signal to arrive substantially simultaneously at the location of each source and then delaying the transmission of the firing signal to each source a sufficient time interval to detonate the sources in a descending order.

5. The method of seismic surveying of claim 4 in which the time intervals are greater than the time required for the waves from a preceding disturbance to be reflected and detected.

References Cited in the file of this patent

UNITED STATES PATENTS

| | | |
|---|---|---|
| 1,007,177 | Bevans | Oct. 31, 1911 |
| 1,029,261 | Bernardi et al. | June 11, 1912 |
| 1,998,412 | Prescott | Apr. 16, 1935 |
| 2,139,581 | Hanley | Dec. 6, 1938 |
| 2,450,366 | Williams | Sept. 28, 1948 |
| 2,550,563 | Hughes | Apr. 24, 1951 |
| 2,556,299 | Scott | June 12, 1951 |
| 2,773,447 | Hall et al. | Dec. 11, 1956 |
| 2,795,287 | Sharpe | June 11, 1957 |
| 2,806,545 | Schempf | Sept. 17, 1957 |